United States Patent [19]
Odell et al.

[11] Patent Number: 5,300,392
[45] Date of Patent: Apr. 5, 1994

[54] IMAGING MEMBER WITH POLYCARBONATE OBTAINED FROM CYCLIC OLIGOMERS

[75] Inventors: Peter G. Odell; Dasarao K. Murti, both of Mississauga; Trevor I. Martin, Burlington, Canada

[73] Assignee: Xerox Corporation, Stamford, Conn.

[21] Appl. No.: 905,697

[22] Filed: Jun. 29, 1992

[51] Int. Cl.$^5$ .......................................... G03G 5/047
[52] U.S. Cl. ........................................ 430/130; 430/96
[58] Field of Search ...................... 430/57, 58, 59, 96, 430/127, 130

[56] References Cited

U.S. PATENT DOCUMENTS

| | | | |
|---|---|---|---|
| 4,265,990 | 5/1981 | Stolka et al. | 430/59 |
| 4,551,404 | 11/1985 | Hiro et al. | 430/59 |
| 4,605,731 | 8/1986 | Evans et al. | 528/371 |
| 4,644,053 | 2/1987 | Brunelle et al. | 528/371 |
| 4,888,441 | 12/1989 | Calbo, Jr. et al. | 560/198 |
| 5,187,036 | 2/1993 | Matsui et al. | 430/80 |
| 5,190,840 | 3/1993 | Weiss et al. | 430/96 |

FOREIGN PATENT DOCUMENTS 0237953 11/1987 European Pat. Off. .

*Primary Examiner*—John Goodrow
*Attorney, Agent, or Firm*—E. O. Palazzo

[57] ABSTRACT

A process for the preparation of photoconductive imaging members which comprises coating a supporting substrate with a photogenerator layer comprised of photogenerating pigments, and subsequently applying to the photogenerating layer a mixture comprised of charge transport molecules and cyclic oligomers, and wherein said mixture is heated to obtain polycarbonate resin binder from said cyclic oligomers.

25 Claims, No Drawings

IMAGING MEMBER WITH POLYCARBONATE OBTAINED FROM CYCLIC OLIGOMERS

BACKGROUND OF THE INVENTION

The present invention is directed generally to photoresponsive, or photoconductive imaging members, and more specifically to photoconductive imaging members comprised of certain polycarbonate resin binders. One embodiment of the present invention is directed to an imaging member comprised of a supporting substrate, a photogenerating layer in contact therewith, and a charge, especially hole, transport layer thereover, and wherein the transport layer and/or photogenerating pigment is dispersed in polycarbonates obtained from cyclic oligomers. The present invention also relates to processes for the preparation of imaging members without solvents in embodiments, wherein the polycarbonate resin binder is formed simultaneously with the charge transport and/or photogenerating layer. Imaging members of the present Invention can be sensitive to wavelengths of from about 400 to about 800 nanometers, that is from the visible region to the near infrared wavelength region of the light spectrum. Moreover, in embodiments thereof the imaging members of the present invention possess low dark decay characteristics as illustrated herein and enable developed images, both line and solid areas, of high resolution, that is with substantially no background deposits. The imaging members of the present invention can be selected for electrophotographic, especially xerographic imaging and printing systems.

Layered photoconductive imaging members with certain polycarbonate resin binders are known. One layered photoresponsive device has been described in U.S. Pat. No. 4,265,990, the disclosure of which is totally incorporated herein by reference. Photoresponsive materials containing a hole injecting layer overcoated with a hole transport layer, followed by an overcoating of a photogenerating layer, and a top coating of an insulating organic resin, are disclosed in U.S. Pat. No. 4,251,612, the disclosure of which is totally incorporated herein by reference. Examples of photogenerating layers disclosed in these patents include trigonal selenium and phthalocyanines, while examples of transport layers include certain aryl diamines as illustrated therein- These imaging members are usually prepared by first providing on a supporting substrate a photogenerating layer of, for example, trigonal selenium and thereafter solution coating thereover from a solvent mixture a charge transport layer and a polycarbonate resin, such as MAKROLON®. Thus the polycarbonate resin binder is in the form of a polymer when selected for the preparation of the imaging member. With the invention of the present invention, in embodiments there is selected a monomer and this monomer is converted into a polymer simultaneously with the coating of the charge transport layer. Advantages of the aforementioned include, for example, the use of solvents like toluene or tetrahydrofuran, rather than the toxic and environmentally damaging chlorinated, such as methylene chloride, organic solvents to form a coating. Since solution viscosity is proportional to molecular weight, and it is the coating solution viscosity that determines the concentration for any given coating technique, the use of higher solid loadings in the coating solution is readily achievable as the cyclic oligomer precursor to the polycarbonate polymer possesses a much lower by, for example, orders, such as 10, of magnitude solution viscosity than the polymer itself, thus higher solid loadings are desirable to reduce volatile organic concentrations emitted during the coating process. The processes of the present invention and imaging members thereof allow the transport binder to be optionally crosslinked to provide tougher and more solvent resistant coatings. Also provided in embodiments are higher, 100,000 to 300,000 vs about 40,000, for spray coating molecular weight polycarbonate films formed using spray or dip coating techniques than can be achieved with a polymer solution. The use of a solvent for forming a photoreceptor film may be avoided entirely with the present Invention in embodiments by coating the cyclic oligomers and transport molecule mixture as a melt or a powder before curing the cyclic oligomers to provide a high molecular weight polymer. Additionally, by using mixtures of different structured cyclic oligomers high molecular copolymers of exact stoichiometry can be obtained that are not readily obtained by either the known interfacial or melt transesterification processes for producing polycarbonates.

Documents illustrating layered organic electrophotographic photoconductor elements with azo, bisazo, and related compound, and in some instances charge transport layers dispersed in certain polycarbonates, and wherein the charge transport layer can be applied to the photogenerating layer by solution coating include U.S. Pat. No. 4,390,611, U.S. Pat. No. 4,551,404, U.S. Pat. No. 4,996,754, Japanese Patent 60-4354, U.S. Pat. No. 4,400,455, U.S. Pat. No. 4,390,608, U.S. Pat. No. 4,327,168, U.S. Pat. No. 4,299,896, U.S. Pat. No. 4,314,015, U.S. Pat. No. 4,486,522, U.S. Pat. No. 4,486,519, U.S. Pat. No. 4,955,667, U.S. Pat. No. 4,440,845, U.S. Pat. No. 4,486,800, U.S. Pat. No. 4,309,611, U.S. Pat. No. 4,418,133, U.S. Pat. No. 4,293,628, U.S. Pat. No. 4,427,753, U.S. Pat. No. 4,495,264, U.S. Pat. No. 4,359,513, U.S. Pat. No. 3,898,084, U.S. Pat. No. 4,830,944, U.S. Pat. No. 4,820,602, and U.S. Pat. No. 3,989,084, the disclosures of which are totally incorporated herein by reference.

SUMMARY OF THE INVENTION

It is an object of the present invention to provide imaging members with many of the advantages illustrated herein.

It is another object of the present invention to provide processes for the preparation of imaging members wherein solvents like methylene chloride can be avoided.

It is another object of the present invention to provide processes for photoconductive imaging members wherein the resin binder is obtained from heating a cyclic oligomer together with charge transport molecules.

It is another object of the present invention to provide processes for photoconductive imaging members wherein the resin binder is obtained from heating a cyclic oligomer together with photogenerating pigments.

Another object of the present invention Is to provide high molecular weight polycarbonates from cyclic oligomers, reference for example U.S. Pat. Nos. 4,644,053 and 4,888,441, the disclosures of which are totally incorporated herein by reference, and wherein the polycarbonates have a molecular weight of 100,000 Daltons, or greater, and more specifically from about 100,000 to about 500,000, and preferably from about 100,000 to about 300,000, and with narrow distributions, for example, in the range of 1.8 to 3.0.

These and other objects of the present Invention can be accomplished in embodiments by the provision of imaging members and processes thereof. More specifically, the present invention is directed to processes for the preparation of imaging members, and the members thereof, comprising the simultaneous formation of a charge transport layer comprised of charge transport molecules and a polycarbonate resin binder, and wherein the resin binder is formed from a cyclic oligomer. Also, in embodiments the present invention is directed to processes for the preparation of imaging members comprising the simultaneous formation of a photogenerating layer comprised of photogenerating pigments and a polycarbonate resin binder and wherein the resin binder is formed from a cyclic oligomer. In embodiments, the polycarbonate resin binder obtained from the cyclic oligomer is generated in the absence of a solvent.

The synthesis of BP(A) cyclic oligomers available from General Electric is based on the process illustrated in Brunelle et al., *Jour. Amer. Chem. Soc.*, 1990,1 12, 2399 to 2402, the disclosure of which is totally incorporated herein by reference. The reaction can be conducted in a one liter Morton flask equipped with a mechanical stirrer, a condenser, septum, addition funnel and heating mantle. To this flask were added 200 milliliters of methylene chloride, 7 milliliters of deionized water, 3 milliliters of 9.75 Molar NaOH solution, and 2.4 milliliters of triethyl amine. Stirring and gentle reflux were begun. Bisphenol A bischloroformate, about 70.5 grams, obtained from VanDeMark Chemical Company of Lockport, N.Y., previously recrystallized from hexane, were dissolved into 200 milliliters of methylene chloride and added to the flask by means of a peristaltic pump over a period of forty minutes. Concurrently, about 59 milliliters of about 9.75 Molar sodium hydroxide solution was added by means of the addition funnel and about 2.4 milliliters of triethyl amine were added by means of a syringe pump. After forty minutes, the reaction was terminated by the addition of 200 milliliters of 1M HCl solution. The reaction mixture was transferred to a separatory funnel where the organic and aqueous layers separated and the organic layer was washed with deionized water (3×) and once with saturated NaCl solution, then dried over magnesium sulfate. The methylene chloride was removed on a rotovap and the resulting solid was mixed with several volumes of acetone. Filtration of the acetone extract and subsequent removal of the acetone yielded 24 grams of a mixture of different ring sizes of cyclic oligomers of 4,4'-isopropylidenebisphenol carbonate. As Brunelle discloses in *Macromolecules*, 1991, 24, 3035, the disclosure of which is totally incorporated herein by reference, the mixture of different ring sizes, as opposed to a single discrete size, is important to achieve a lower melting and hence processable material. Also, this same paper extensively characterized the oligomers. Confirmation of the product structure was determined by GPC and NMR. Methylene chloride can be avoided during the coating procedure in which much greater amounts are used under conditions that make recovery much more difficult and expensive than in a sealed reactor. With the present invention in embodiments, methylene chloride can be selected to prepare cyclic oligomer precursors while &4 methylene chloride can be avoided for coating a film of a polycarbonate obtained from the oligomers.

About 0.5 gram of the above prepared BP(A) cyclic oligomer (0.43 gram of N,N'-diphenyl-N,N'-bis(alkylphenyl)-[1,1'-biphenyl]-4,4-diamine, 4 milliliters of $CH_2Cl_2$, and 50 microliters of a 0.01 gram/milliliter of methylene chloride solution of tetrabutyl ammonium tetraphenylborate) were added to a small vial. The methylene chloride was removed by gentle warming while under a nitrogen atmosphere on a hot plate at about 500° C. for two hours followed by about thirty minutes at about 135° C. to remove the methylene chloride. The hot plate temperature was then raised to about 300° C. for thirty minutes and then allowed to cool. A hard solid disk was obtained at the bottom of the vials and for the purpose of xerographic testing the disk material was redissolved in methylene chloride and coated on top of trigonal Se, and thereover there was coated an aryl amine charge transport layer. The device was tested for xerographic cycling stability and found to be excellent for 100,000 Imaging cycles In a Xerox Corporation modified 1075. The number average molecular weight, the weight average molecular weight and the Mw/Mn ratio of the polycarbonate products obtained were determined by a Waters Gel Permeation Chromatograph employing four ULTRASTYRAGEL® columns with pore sizes of 100, 500, 500, and 104 Angstroms and using THF (tetrahydrofuran) as a solvent. The molecular weight of the aforementioned obtained polymer binder as determined by GPC was a $M_n$ of 105,000 and a $M_w$ of 180,000 with a dispersity of 1.8.

In the preceding example, the BP(A) cyclic oligomer and the N,N'-diphenyl-N,N'-bis(alkylphenyl)-[1,1'-biphenyl]-4,4'-diamine charge transport were mixed by dissolution in methylene chloride for experimental convenience as illustrated by the following embodiment. About 0.6155 gram of BP(A) cyclic oligomer, about 0.4047 gram of N,N'-diphenyl-N,N'-bis(alkylphenyl)-[1,1'-biphenyll-4,4'-diamine, and about 0.0042 gram of tetramethylammonium tetraphenylborate were mixed and ground in an agate mortar, and the resulting fine powder was placed on a TEFLON® sheet on a hot plate under a nitrogen atmosphere and the hot plate temperature was increased to about 300° C. over a period of fifteen minutes, retained at that temperature for a further twenty minutes, and then allowed to cool. The obtained polymer, poly(4,4'-isopropylidenebisphenol) carbonate had GPC molecular weights of $M_n$ of 76,000 and a $M_w$ of 176,000 with a dispersity of 2.32. There is thus obtained a charge transport layer of transport molecules dispersed in a high molecular weight polycarbonate without the use of a solvent. It is envisaged that the solventless coating can be obtained by the known powder coating techniques using a ground mixture as illustrated here, or by the known melt coating techniques and employing the low viscosity oligomer melt mixture.

The substrate can be formulated entirely of an electrically conductive material, or It can be an insulating material having an electrically conductive surface. The substrate is of an effective thickness, generally up to about 100 mils, and preferably from about 1 to about 50 mils, although the thickness may be outside of this range. The thickness of the substrate layer depends on many factors, including economic and mechanical considerations. Thus, this layer may be of substantial thickness, for example over 100 mils, or of minimal thickness provided that there are no adverse effects on the system. In one embodiment, the thickness of this layer is from about 3 mils to about 10 mils. The substrate can be opaque or substantially transparent and can comprise numerous suitable materials having the desired mechanical properties. The entire substrate can comprise the same material as that of the electrically conductive surface or the electrically conductive surface can merely be a coating on the substrate. Any suitable electrically conductive material can be employed. Typical electrically conductive materials include copper, brass, nickel, zinc, chromium, stainless steel, conductive plastics and rubbers, aluminum, semitransparent aluminum, steel, cadmium, titanium, sliver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. The substrate layer can vary in thickness over substantially wide ranges depending on the desired use of the electrophotoconductive member. Generally, the conductive layer ranges in thickness of from about 50 Angstroms to several centimeters, although the thickness can be outside of this range- When a flexible electrophotographic imaging member is desired, the thickness typically is from about 100 Angstroms to about 750 Angstroms. The substrate can be of any other conventional material, including organic and inorganic materials. Typical substrate materials include insulating nonconducting materials such as various resins known for this purpose .including polycarbonates, polyamides, polyurethanes, paper, glass, plastic, polyesters such as MYLAR ® (available from DuPont) or MELINEX 447 ® (available from ICI Americas, Inc.), and the like. When desired, a conductive substrate can be coated onto an insulating material. In addition, the substrate can comprise a metanized plastic, such as titanized or aluminized MYLAR ®, wherein the metallized surface is in contact with the photogenerating layer or any other layer situated between the substrate and the photogenerating layer. The coated or uncoated substrate can be flexible or rigid, and can have any number of configurations, such as a plate, a cylindrical drum, a scroll, an endless flexible belt, or the like. The outer surface of the substrate preferably comprises a metal oxide such as aluminum oxide, nickel oxide, titanium oxide and the like.

In embodiments, intermediate adhesive layers between the substrate and subsequently applied layers may be desirable to improve adhesion. If such adhesive layers are utilized, they preferably have a dry thickness of from about 0.1 micron to about 5 microns, although the thickness can be outside of this range. Typical adhesive layers include film forming polymers such as polyester, polyvinylbutyral, polyvinylpyrolidone, polycarbonate, polyurethane, polymethylmethacrylate, and the like as well as mixtures thereof. Since the surface of the substrate can be a metal oxide layer or an adhesive layer, the expression "substrate" as employed herein is intended in embodiments to include a metal oxide layer with or without an adhesive layer thereon.

The photogenerating layer comprised, for example, of known pigments like metal phthalocyanines, vanadyl phthalocyanines, titanyl phthalocyanines, especially Type IV, squaraines, trigonal selenium, and the like, is of an effective thickness, for example a thickness of from about 0.05 micron to about 10 microns or more, and in embodiments has a thickness of from about 0.1 micron to about 3 microns. The thickness of this layer, however, is dependent primarily upon the concentration of photogenerating material in the layer, which may generally vary from about 5 to 100 percent. When the photogenerating material is present in a binder material, the binder preferably contains from about 30 to about 95 percent by weight of the photogenerating material, and preferably contains about 80 percent by weight of the photogenerating material. Generally, it is desirable to provide this layer in a thickness sufficient to absorb about 90 percent or more of the incident radiation which is directed upon it in the imagewise or printing exposure step. The maximum thickness of this layer is dependent primarily upon factors such as mechanical considerations, such as the specific photogenerating compound selected, the thicknesses of the other layers, and whether a flexible photoconductive imaging member is desired.

Charge transport layers are well known in the art. Typical transport layers are described, for example, in U.S. Pat. Nos. 4,265,990; 4,609,605; 4,297,424 and 4,921,773, the disclosures of each of these patents being totally incorporated herein by reference. Organic charge transport materials can be employed.

Hole transport molecules of the type described in U.S. Pat. Nos. 4,306,008; 4,304,829; 4,233,384; 4,115,116; 4,299,897 and 4,081,274, and U.S. Pat. No. 5,139,910, the disclosures of each of which are totally incorporated herein by reference, can be selected for the imaging members of the present invention. Typical diamine hole transport molecules include N,N'-diphenyl-N,N'-bls(3-methylphenyl)-(1,1'-biphenyl)-4,4'-diamine, N,N'-diphenyl-N,N'-bis(4-methylphenyl)-(1,1'-biphenyl)-4,4'-diamine, N,N'-diphenyl-N,N'-bis(2-methylphenyl)-(1,1'-biphenyl)-4,4'-diamine, N,N'-diphenyl-N,N'-bis(3-ethylphenyl)-(1,1'-biphenyl)-4,4'-diamine, N,N'-diphenyl-N,N'-bis(4-ethylphenyl)-(1,1'-biphenyl)-4,4'-diamine, N,N'-diphenyl-N,N'-bis(4-n-butylphenyl)-(1,1'-biphenyl)-4,4'-diamine, N,N'-diphenyl-N,N'-bis(3-chlorophenyl)-[1,1'-biphenyll-4,4'-diamine, N,N'-diphenyl-N,N'-bis(4-chlorophenyl)-[1,1'-biphenyll-4,4'-diamine, N,N'-diphenyl-N,N'-bis(phenylmethyl)-[1,1'-biphenyll-4,4'-diamine, N,N,N,N'-tetraphenyl-[2,2'-dimethyl-1,1'-biphenyll-4,4'-diamine, N,N,N,N'-tetra-(4-methylphenyl)-[2,2'-dimethyl-1,1'-biphenyll-4,4'-diamine, N,N'-diphenyl-N,N'-bis(4-methylphenyl)-[2,2'-dimethyl-1,1'-biphenyll-4,4'-diamine, N,N'-diphenyl-N,N'-bis(2'-methylphenyl)-[2,2'-dimethyl-1,1-biphenyll-4,4'-diamine, N,N'-diphenyl-N,N'-bis(3-methylphenyl)-[2,2'-dimethyl-1,1-biphenyll-4,4'-diamine, N,N'-diphenyl-N,N'-bis(3-methylphenyl)-pyrenyl-1,6-diamine, and the like.

In embodiments of the present invention, one hole transport layer is comprised of components as represented, or essentially represented, by the following general formula

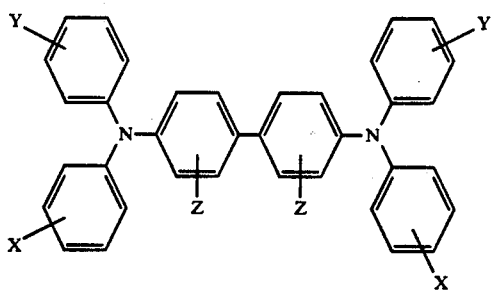

wherein X, Y and Z are selected from the group consisting of hydrogen, an alkyl group with, for example, from 1 to about 25 carbon atoms and a halogen preferably chlorine, and at least one of X, Y and Z is independently hydrogen, an alkyl group or chlorine. When Y and Z are hydrogen, the compound may be named N,N'-diphenyl-N,N'-bis(alkylphenyl)-[1,1'-biphenyl]-4,4'-diamine wherein the alkyl is, for example, methyl, ethyl, propyl, n-butyl, or the like, or the compound may be N,N'-diphenyl-N,N'-bis(chlorophenyl)-[1,1'-biphenyl]-4,4'-diamine. Preferred aryl diamine charge transports are illustrated in U.S Pat. No. 4,265,990, the disclosure of which is totally incorporated herein by reference.

The charge transport material is present in the charge transport layer In an effective amount, generally from about 5 to about 90 percent by weight, preferably from about 20 to about 75 percent by weight, and more preferably from about 30 to about 60 percent by weight, although the amount can be outside of these ranges. The inactive resin binder for the charge transport and/or photogenerating layer are comprised of the polycarbonates obtained as illustrated herein, and which polycarbonates are formed by heating oligomers during the fabrication of the imaging member.

The photoconductive imaging member may optionally contain a charge blocking layer situated between the conductive substrate and the photogenerating layer. This layer may comprise metal oxides, such as aluminum oxide and the like, or materials such as silanes and nylons. Additional examples of suitable materials include polyisobutyl methacrylate, copolymers of styrene and acrylates such as styrene/n-butyl methacrylate, copolymers of styrene and vinyl toluene, polycarbonates, alkyl substituted polystyrenes, styrene-olefin copolymers, polyesters, polyurethanes, polyterpenes, silicone elastomers, mixtures thereof, copolymers thereof, and the like. The primary purpose of this layer is to prevent charge injection from the substrate during and after charging. This layer is of a thickness of less than 50 Angstroms to about 10 microns, and preferably is no more than about 2 microns in thickness.

In addition, the photoconductive imaging member may also optionally contain an adhesive interface layer situated between the hole blocking layer and the photogenerating layer. This layer may comprise a polymeric material such as polyester, polyvinyl butyral, polyvinyl pyrrolidone and the like. Typically, this layer is of a thickness of less than about 0.6 micron.

The present invention also encompasses a method of generating images with the photoconductive imaging members disclosed herein. The method comprises the steps of generating an electrostatic latent image on a photoconductive imaging member of the present invention, developing the latent image, and transferring the developed electrostatic image to a substrate. Optionally, the transferred image can be permanently affixed to the substrate. Development of the image may be achieved by a number of methods, such as cascade, touchdown, powder cloud, magnetic brush, and the like. Transfer of the developed image to a substrate may be by any method, including those making use of a corotron or a biased roll. The fixing step may be performed by means of any suitable method, such as flash fusing, heat fusing, pressure fusing, vapor fusing, and the like- Any material used in xerographic imaging and printing may be used as a substrate, such as paper, transparency material, or the like.

In embodiments, the present invention is directed to a process for the preparation of a photoconductive imaging member which comprises coating a supporting substrate with a photogenerator layer comprised of photogenerating pigments, and subsequently applying to the photogenerating layer a mixture comprised of charge transport molecules and cyclic oligomers, and wherein the said mixture is heated to obtain a polycarbonate resin binder from said cyclic oligomer; a process for the preparation of a photoconductive imaging member which comprises coating a supporting substrate with a photogenerator layer comprised of photogenerating pigments, and subsequently applying to the photogenerating layer a mixture of charge transport molecules and a cyclic oligomer having a degree of polymerization of from 2 to about 20, and a known catalyst and wherein said mixture is heated subsequent to application thereof to the photogenerator layer to obtain a polycarbonate resin binder from said cyclic oligomer, and a process for the preparation of a photoconductive imaging member which comprises coating a supporting substrate with a photogenerator layer comprised of a mixture of photogenerating pigments and cyclic oligomers, and wherein the said mixture is heated to obtain a polycarbonate resin binder from said cyclic oligomers, and subsequently applying to the photogenerating layer a charge transport layer comprised of charge transport molecules. The cyclic oligomer in embodiments can be represented by the formula

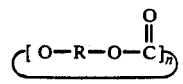

wherein n represents the degree of polymerization and is, for example, a number of from 2 to about 20, and R represents the principle repetition unit of the formula

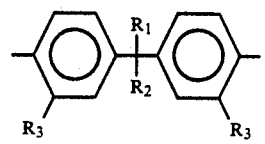

wherein $R_1$, $R_2$, and $R_3$ are independently selected from the group consisting of hydrogen, alkyl and aryl. Examples of polycarbonates obtained from the cyclic oligomers include, for example, poly(4,4'-hexafluoroisopropylidenebisphenol) carbonate; poly(4,4'-(1,4-phenylenebisisopropylidene)bisphenol) carbonate; poly(4,4'-(1,4-phenylenebisethylidene)bisphenol) carbonate, poly (4,4'-cyclohexylidenebisphenol) carbonate; poly(4,4'-isopropylidenebisphenol) carbonate; poly(4,4'-cyclohexylidene-2,2'-dimethylbisphenol) carbonate; poly(4,4'-isopropylidene-2,2'-dimethylbisphenol) carbonate; poly(4,4'-diphenylmethylidenebisphenol) carbonate; poly(4-t-butylcyclohexylidenebisphenol) carbonate; poly (4,4'-hexafluoroisopropylidenebisphenol-co-4,4'-(1,4'-phenylenebisisopropylidene)bisphenol) carbonate, poly(4,4'-hexafluoroisopropylidenebisphenol-co-4,4'-isopropylidene-2,2'-dimethylbisphenol) carbonate, poly (4,4'hexafluoroisopropylidenebisphenol-co-4,4'-isopropylidenebisphenol) carbonate, poly(4,4'-isopropylidene-2,2'-dimethylbisphenol-co-4,4-isopropylidenebisphenol) carbonate, poly(4,4'-isopropylidene-2,2'-dimethylbisphenol-co-4,4'-(1-phenylethylidene)bisphenol) carbonate, and poly(4,4'-isopropylidene-2,2'-dimethylbisphenol-co-4,4'-cyclohexylidenebisphenol) carbonate.

Specific embodiments of the invention will now be described in detail. These Examples are intended to be illustrative, and the invention is not limited to the materials, conditions, or process parameters set forth in these embodiments. All parts and percentages are by weight unless otherwise indicated. A comparative control Example is also provided.

EXAMPLE I

Synthesis of BP(A) Cyclic Oligomers:

The reaction was conducted in a one liter Morton flask equipped with a mechanical stirrer, a condenser, septum, addition funnel and heating mantle. To this flask were added 200 milliliters of $CH_2Cl_2$, 7 milliliters of deionized water, 3 milliliters of 9.75 Molar NAOH solution, and 2.4 milliliters of triethyl amine. Stirring and gentle reflux were begun. Bisphenol A bischloroformate, obtained from VanDeMark Chemical Company of Lockport, NY, previously recrystallized from hexane, about 70.5 grams, were dissolved into 200 milliliters of methylene chloride and added to the above flask by means of a peristaltic pump over a period of forty minutes. Concurrently, about 59 milliliters of about 9.75 Molar sodium hydroxide solution was added by means of the addition funnel and about 2.4 milliliters of triethyl amine was added by means of a syringe pump. After forty minutes, the reaction was terminated by the addition of 200 milliliters of 1 M HCl solution. The reaction mixture was transferred to a separatory funnel where the organic and aqueous layers separated and the organic layer was washed with deionized water (3X) and once with saturated NaCl solution, then dried over magnesium sulfate. The methylene chloride was removed on a rotovap and the resulting solid was mixed with several volumes of acetone. Filtration of the acetone extract and subsequent removal of the acetone yielded 24 grams of a mixture of different ring sizes of cyclic oligomers of 4,4'-isopropylidenebisphenol carbonate. Confirmation of the product structure was determined by GPC and NMR. GPC analysis evidenced a cluster of about 6 discernible peaks with the weight average molecular weight for the entire group of about 1,200 Daltons relative to polystyrene. NMR analysis was consistent with a cyclic structure for the 4,4'-isopropylidenebisphenol carbonate mixture.

EXAMPLE 11

About 0.9 gram of the BP(A) cyclic oligomer of Example I, 0.43 gram of N,N'-diphenyl-N,N'-bis(alkylphenyl)-[1,1'-biphenyll-4,4'-diamine, 4 milliliters of methylene chloride, $CH_2Cl_2$, and 0.5 milliliter of a 1.25 percent solution of TI(OBU)$_4$ were added to a small 30 milliliter vial. The methylene chloride was removed by gentle warming on a hot plate and the vial contents remained overnight, about 18 hours. The following day the total volume had been reduced to about 1 milliliter and the resulting thick oil was mixed with a spatula and warmed again to remove more of the methylene chloride. The vial was then placed in oven at a temperature of 278° C., through which nitrogen was flushed. The oven temperature dropped briefly to 276° C., then returned to 278° C. and then slowly rose to 280° C. during the 35 minutes the vial was in it. After 35 minutes, the vial was removed and allowed to cool to room temperature. A hard solid disk of a hole transporting matrix of diphenyl-N,N'-bis(alkylphenyl)-[1,1'-biphenyll-4,4'-diamine dispersed in poly(4,4'-isopropylidenebisphenol) carbonate was obtained at the bottom of the vial, and which polycarbazole was soluble in THF. GPC molecular weights were $M_n$ of 16,700 and $M_w$ of 38,000 Daltons for the polycarbonate product.

EXAMPLE III

About 0.5 gram of the BP(A) cyclic oligomer of Example I, 0.43 gram of N,N'-diphenyl-N,N'-bis(alkylphenyl)-[1,1'-biphenyll-4,4'-diamine, 4 milliliters of $CH_2Cl_2$, and 50 microliters of a 0.01 gram/milliliter of methylene chloride solution of catalyst of tetrabutylammonium tetraphenylborate ($1.48 \times 10^{-6}$ moles catalyst/gram macrocycle) were added to a small 30 milliliter vial. The methylene chloride was removed to the atmosphere by gentle warming while under a nitrogen atmosphere on a hot plate at about 50° C. for two hours followed by about thirty minutes at about 135° C. to further remove the methylene chloride. The hot plate temperature was then raised to about 300° C. for thirty minutes and then allowed to cool. A hard solid disk of a hole transporting matrix of diphenyl-N,N'-bis(alkylphenyl)-[1,1'-biphenyl]-4,4'-diamine, 55 percent, dispersed in poly(4,4'-isopropylidenebisphenol) carbonate, 45 percent, was obtained at the bottom of the vial. The number average molecular weight, the weight average molecular weight and the $M_w/M_n$ ratio were determined by a Waters Gel Permeation Chromatograph employing four Ultrastyragel ® columns with pore sizes of 100, 500, 500, and 104 Angstroms and using THF (tetrahydrofuran) as a solvent. The molecular weight of the obtained poly(4,4'-isopropylidenebisphenol) carbonate polymer binder as determined by GPC was an $M_n$ of 105,000 and a $M_w$ of 180,000 with a dispersity of 1.8.

EXAMPLE IV

The process of Example III was repeated except that the amount of tetrabutylammonium tetraphenylborate was changed to $4.45 \times 10^{-6}$ moles catalyst/gram macrocycle. A hole transporting matrix of diphenyl-N,N' -bis(alkylphenyl)-[1,1'-biphenyll-4,4'-diamine dispersed in poly(4,4'-isopropylidenebisphenol) carbonate was formed wherein the polycarbonate had a GPC molecular weight $M_n$ of 83,500 and a $M_w$ of 165,000 with ad ispersity of 2.0.

EXAMPLE V

The process of Example III was repeated except that the catalyst employed was aluminum di(isopropoxide)acetoacetic ester chelate at an amount of $2.38 \times 10^{-6}$ moles catalyst/gram macrocycle. A hole transporting matrix of diphenyl-N,N'-bis(alkylphenyl)-[1,1'-biphenyll-4,4'-diamine dispersed in poly(4,4'-isopropylidenebisphenol) carbonate was formed wherein the polycarbonate had a GPC molecular weight $M_n$ of 66,900 and a $M_w$ of 135,000 with a dispersity of 2.0.

EXAMPLE VI

The process of Example III was repeated except that the catalyst employed was titanium diisopropoxide bis(2,4-pentanedione) at an amount of $1.59 \times 10^{-6}$ moles catalyst/gram macrocycle. A hole transporting matrix of diphenyl-N,N'-bis(alkylphenyl)-[1,1'-biphenyll-4,4'-diamine dispersed in poly(4,4'-isopropylidenebisphenol) carbonate was formed wherein the polycarbonate had a GPC molecular weight $M_n$ of 47,000 and a $M_w$ of 99,900 with a dispersity of 2.1.

EXAMPLE VII

About 0.6155 gram of BP(A) cyclic oligomer, about 0.4047 gram of N,N'-diphenyl-N,N'-bis(alkylphenyl)-[1,1'-biphenyll-4,4'-diamine, and about 0.0042 gram of tetramethylammonium tetraphenylborate were mixed and ground in an agate mortar for about ten minutes, and the resulting fine powder was placed on a TEFLON ® sheet on a hot plate under a nitrogen atmosphere, and the hot plate temperature raised to about 300° C. over a period of fifteen minutes, held at that temperature for a further twenty minutes and then allowed to cool. The obtained polymer poly(4,4'-isopropylidenebisphenol) carbonate had GPC molecular weights $M_n$ of 76,000 and a $M_w$ of 176,000 with a dispersity of 2.32. This illustrates the ability to obtain a charge transport layer comprised of a transport molecule dispersed in a high molecular weight polycarbonate without the use of a solvent.

EXAMPLE VIII

Layered photoresponsive imaging members comprised of N,N-diphenyl-N,N'-bis(3-methylphenyl)-[1,1'-biphenyl]-4,4'-diamine(TPD) molecularly dispersed in the polymer binder as obtained in Examples III to VI as the hole transport layer, and a trigonal selenium generator layer were fabricated in each instance as follows:

A dispersion of trigonal selenium and poly(N-vinyl carbazole) was prepared by ball milling 1.6 grams of trigonal selenium and 1.6 grams of poly(N-vinyl carbazole) in 14 milliliters each of tetrahydrofuran and toluene. Ten grams of the resulting slurry was then diluted with a solution of 0.24 gram of N,N'-diphenyl-N,N'-bis(3-methylphenyl)-[1,1'-biphenyl]-4,4'-diamine(TPD) in 5 milliliters each of tetrahydrofuran and toluene. A 1.5 micron thick photogenerator layer was fabricated by coating the above dispersion onto an aluminized MYLAR ® substrate, thickness of 75 microns, with a Bird film applicator, followed by drying in a forced air oven at 135° C. for 5 minutes.

A solution for the charge transport layer was then prepared by dissolving the hole transporting matrix of diphenyl-N,N'-bis(alkylphenyl)-[1,1'-biphenyl]-4,4'-diamine dispersed in poly(4,4'-isopropylidenebisphenol) carbonate obtained from the above Examples in 5 milliliters of methylene chloride. This solution was then coated over the photogenerator layer by means of a Bird film applicator. The resulting member was then dried in a forced air oven at 135° C. for 20 minutes, resulting in a 20 micron thick charge transport layer.

A solution for the charge transport layer of the imaging member identified as a control was then prepared by dissolving 0.8 gram of N,N'-diphenyl-N,N'-bis(3-methylphenyl)-[1,1'-biphenyll-4,4'-diamine (TPD), 55 percent, 1.2 grams of bisphenol A polycarbonate (MAKROLON 5705 ®) (43), 45 percent, in 10 milliliters of methylene chloride. This solution was then coated over the photogenerator layer by means of a Bird film applicator. The resulting layered photoconductive imaging member was then dried in a forced air oven at 135° C. for 20 minutes, resulting in a 20 micron thick charge transport layer.

The resulting layered photoresponsive imaging members with the polycarbonates of Examples III to VI and the control were tested electrically as follows:

The xerographic electrical properties of the aforementioned imaging members were determined by electrostatically charging the surfaces thereof with a corona discharge source until the surface potentials, as measured by a capacitively coupled probe attached to an electrometer, attained an initial value $V_o$ of about $-800$ volts. After resting for 0.5 second in the dark, the charged members reached a surface potential of $V_{DDP}$, dark development potential, and each member was then exposed to light from a filtered Xenon lamp with a XBO 150 watt bulb. A reduction in surface potential to a $V_{BKG}$ value, background potential, due to photodischarge effect was observed. The background potential was reduced by exposing with a light intensity about 10 times greater than the expose energy. The resulting potential on the imaging member was designated as the residual potential, $V_R$. The dark decay in volt/second was calculated as $(V_o - V_{DDP})/0.5$. The percent of photodischarge was calculated as 100 percent $(V_{DDP} - V_{BKG})/V_{DDP}$. The desired wavelength and energy of the expose light was determined by the type of filters placed in front of the lamp. The broad band white light (400 to 700 nanometers) photosensitivity of these imaging members were measured by using an infrared cut-off filter whereas the monochromatic light photosensitivity was determined using narrow bandpass filter. The photosensitivity of the imaging members is usually provided in terms of the amount of expose energy in erg/cm$^2$, designated as $E_{\frac{1}{2}}$, required to achieve 50 percent of photodischarge from the dark development potential. The higher the photosensitivity, the smaller the $E_{\frac{1}{2}}$ value. The devices were subjected to 1,000 cycles of repeated charging, discharging and erase to determine the cycling stability. Changes in $V_{DDP}$, $V_{BKG}$, $V_{RES}$ are indicated as $\Delta V_{DDP}$, $\Delta V_{BKG}$, $\Delta V_{RES}$. A summary of the results of the electrical testing of the imaging members is shown on Table 1. Also shown are the results obtained with the electrical testing of an imaging member (identified as the control) with MAKROLON 5705 ®, a known polycarbonate resin binder with $M_w$ of 152,000, a $M_n$ of 34,000 and a molecular weight distribution of 4.45 as determined by GPC relative to polystyrene as the binder in the charge transport layer.

TABLE 1

| Sample I.D. | Example III | Example IV | Example V | Example VI | Control Makrolon 5705 ® |
|---|---|---|---|---|---|
| Corotron Voltage (kV) | −5.4 | 5.45 | −5.4 | −5.35 | −5.3 |
| $V_{DDP}$ (Volts) | −800 | −800 | −800 | −800 | −800 |

TABLE 1-continued

| Sample I.D. | Example III | Example IV | Example V | Example VI | Control Makrolon 5705 ® |
|---|---|---|---|---|---|
| Dark Decay (V/s) | 18 | 17 | 21 | 27 | 32 |
| $E_{\frac{1}{2}}$ (ergs/cm$^2$) | 3.5 | 3.5 | 3.4 | 10.0 | 2.1 |
| % Discharge at 10 ergs/cm$^2$ | 76 | 76 | 73 | 50 | 86 |
| Residual Potential (V) | 56 | 58 | 79 | 245 | 15 |
| Cycling data - # cycles | 1,000 | 1,000 | 1,000 | 1,000 | 1,000 |
| $\Delta V_{DDP}$ (Volts) | 0 | 25 | −10 | −100 | −45 |
| $\Delta V_{BKG}$ (Volts) | 10 | 20 | 0 | −130 | 0 |
| $\Delta V_{RES}$ (Volts) | 0 | 20 | 0 | −155 | 0 |

The results shown in Table 1 illustrate the relative photosensitivity and cycling stability. The photosensitivity is indicated by $E_{\frac{1}{2}}$ expressed in ergs/cm$^2$. The photosensitivity of the control sample (2.1 ergs/cm$^2$) is slightly higher than that of Examples III, IV and V (3.5 ergs/cm$^2$). Cycling stability is determined by the changes in $V_{DDP}$, $V_{BKG}$ and $V_{RES}$ due to cycling for 1,000 cycles. The results shown on Table 1 indicate that Examples III and V have a better cycling stability compared to the control sample. The results of Example VI indicate, for example, lesser photosensitivity. The differences among the samples can, it is believed, be primarily attributed to the behavior of the catalyst used. Examples III and IV use the same catalyst, but the lesser amounts used in Example III provide better electrical performance than in Example IV. Example VI appears to provide less effective performance as a result of the catalyst employed in the polymerization. One conclusion from the results of Table 1 is that there is no degradation in electrical properties of the imaging members of Examples III, IV and V compared to the control imaging member.

Other modifications of the present invention may occur to those skilled in the art subsequent to a review of the present application, and these modifications, including equivalents thereof, are intended to be included within the scope of the present invention.

What is claimed is:

1. A process for the preparation of photoconductive imaging members which comprises coating a supporting substrate with a photogenerator layer comprised of photogenerating pigments, and subsequently applying to the photogenerating layer a mixture comprised of charge transport molecules and cyclic oligomers, and wherein said mixture is heated to obtain a polycarbonate resin binder from said cyclic oligomers, and wherein said cyclic oligomers are represented by the formula

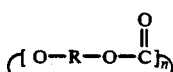

wherein n represents the degree of polymerization and is a number of from 2 to about 20, and R represents the principle repetition unit of the formula

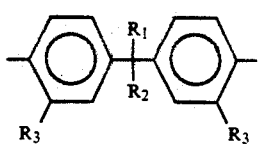

wherein R$_1$, R$_2$, and R$_3$ are independently selected from the group consisting of halogen, halogenated alkyl, hydrogen, alkyl and aryl.

2. A process for the preparation of photoconductive imaging member consisting essentially of coating a supporting substrate with a photogenerator layer comprised of photogenerating pigments, and subsequently applying to the photogenerating layer a mixture of charge transport molecules, cyclic oligomers having a degree of polymerization of from 2 to about 20, and a catalyst, and wherein said mixture is heated subsequent to application thereof to the photogenerator layer to obtain a polycarbonate resin binder from said cyclic oligomer, and wherein said cyclic oligomer is represented by the formula

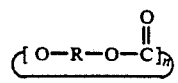

wherein n represents the degree of polymerization and is a number of from 2 to about 20, and R represents the principle repetition unit of the formula

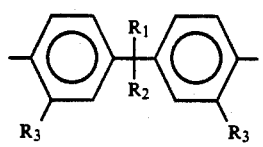

wherein R$_1$, R$_2$, and R$_3$ are independently selected from the group consisting of halogen, halogenated alkyl, hydrogen, alkyl and aryl.

3. A process in accordance with claim 1 wherein the polycarbonate polymer binder obtained has an M$_n$ of about 67,000 and an M$_w$ of about 135,000 with a dispersity of about 2.0, or an M$_n$ of about 47,000 and a M$_w$ of about 100,000 with a dispersity of about 2.1.

4. A process in accordance with claim 1 wherein the cyclic oligomer contains linear oligomers as a minor component in an amount that does not exceed 15 percent to 20 percent by weight.

5. A process in accordance with claim 1 wherein two or more cyclic oligomers of different repeat unit structures are selected to obtain a copolycarbonate.

6. A process in accordance with claim 2 wherein a crosslinking agent is added to the cyclic oligomer mixture.

7. A process in accordance with claim 2 wherein the polycarbonate is selected from the group consisting of poly(4,4'-hexalfuoroisopropylidenebisphenol) carbonate; poly(4,4'-(1,4-phenylenebisisopropylidene)bisphenol) carbonate; poly(4,4'-(1,4-phenylenebisethylidene)bisphenol) carbonate; poly(4,4'-cyclohexylidenebisphenol) carbonate; poly(4,4'-isopropylidenebisphenol) carbonate; poly(4,4'-cyclohexylidene-2,2'-dimethylbisphenol) carbonate; poly(4,4'-isopropylidene-2,2'-dimethylbisphenol) carbonate; poly(4,4'-diphenylmethylidenebisphenol) carbonate; poly(4-t-butylcyclohexylidenebisphenol) carbonate; poly(4,4'-hexafluoroisopropylidenebisphenol-co-4,4'-(1,4-phenylenebisisopropylidene)bisphenol) carbonate, poly(4,4'-hexafluoroisopropylidenebisphenol-co-4,4'-isopropylidene-2,2'-dimethylbisphenol) carbonate, poly(4,4'-hexafluoroisopropylidenebisphenol-co-4,4'-isopropylidenebisphenol) carbonate, poly(4,4'-isopropylidene-2,2'-dimethylbisphenol-co-4,4'-isopropylidenebisphenol) carbonate, poly(4,4'-isopropylidene-2,2'-dimethylbisphenol-co-4,4'-(1-phenylethylidene)bisphenol) carbonate, and poly(4,4'-isopropylidene-2,2'-dimethylbisphenol-co-4,4'-cyclohexylidenebisphenol carbonate.

8. A process in accordance with claim 2 wherein heating is accomplished at a temperature of from between about 200° C. to about 300° C.

9. A process in accordance with claim 2 wherein heating is accomplished by radiative heat, inductive radio frequencies, or by microwave radiation.

10. A process in accordance with claim 2 wherein the application of the mixture of the cyclic oligomer and charge transport molecules is accomplished by solution coating, melt coating or powder coating.

11. A process in accordance with claim 1 wherein the heating is accomplished in the presence of a catalyst.

12. A process in accordance with claim 2 wherein the catalyst is selected from the group consisting of aluminum di(isopropoxide)acetoacetic ester chelate, tetrabutylammonium tetraphenylborate, tetramethylammonium tetraphenylborate, titanium diisopropoxide bis(2,4-pentanedione), titanium tetraisopropoxide, titanium tetrabutoxide, tetraphenylphosphonium tetraphenylborate, lithium phenoxide, and lithium salicylate.

13. A process in accordance with claim 1 wherein the obtained polymer has a weight average molecular weight of from between about 50,000 and about 300,000.

14. A process in accordance with claim 2 wherein the photogenerating pigments are comprised of metal phthalocyanines, metal free phthalocyanines, vanadyl phthalocyanines, titanyl phthalocyanines trigonal selenium, or benzimidazole perylenes.

15. A process in accordance with claim 1 wherein the charge transport layer is situated between the substrate and the photogenerator layer.

16. A process in accordance with claim 2 wherein the supporting substrate is comprised of a conductive substrate comprised of a metal.

17. A process in accordance with claim 2 wherein the charge transport molecules are dispersed in the polycarbonate produce resinous binder in an amount of from about 5 percent by weight to about 95 percent by weight.

18. A process in accordance with to claim 2 wherein the charge transport molecules comprise aryl amines of the formula

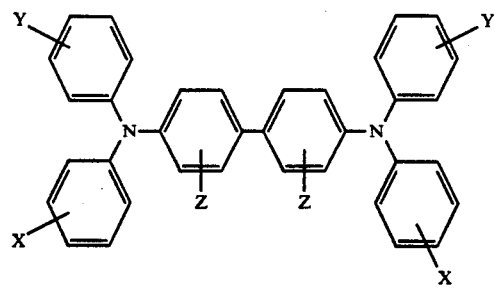

wherein X, Y and Z are selected from the group consisting of hydrogen, alkyl and halogen.

19. A process in accordance with claim 17 wherein alkyl contains from about 1 to about 25 carbon atoms.

20. A process for the preparation of a photoconductive imaging member which comprises coating a supporting substrate with a photogenerator layer comprised of a mixture of photogenerating pigments and cyclic oligomers and wherein said mixture is heated to obtain a polycarbonate resin binder from said cyclic oligomers, and subsequently applying to the photogenerating layer a charge transport layer comprised of charge transport molecules.

21. A process in accordance with claim 20 wherein the cyclic oligomers are represented by the formula

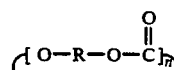

wherein n represents the degree of polymerization and is a number of from 2 to about 20, and R represents the principle repetition unit of the formula

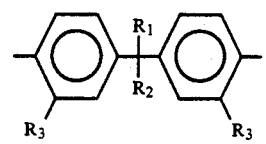

wherein $R_1$, $R_2$, and $R_3$ are independently selected from the group consisting of hydrogen, alkyl and aryl.

22. A process in accordance with claim 1 wherein the cyclic oligomer is comprised of 4,4'-isopropylidene bisphenol carbonate.

23. A process in accordance with claim 22 wherein the catalyst is selected from the group consisting of tetrabutyl ammonium tetraphenyl borate, aluminum di(isopropoxide) acetoacetic ester chelate, and titanium diisopropoxie bis(2,4-pentanedione).

24. A process in accordance with claim 1 wherein the polycarbonate polymer binder obtained has an $M_n$ of about 105,000 and an $M_w$ of about 180,000 with a dispersity of about 1.8.

25. A process in accordance with claim 1 wherein the polycarbonate polymer binder obtained has an $M_n$ of about 83,500 and an $M_w$ of about 165,000 with a dispersity of about 2.0.

* * * * *